United States Patent [19]

Gruhler et al.

[11] Patent Number: 4,566,199

[45] Date of Patent: Jan. 28, 1986

[54] SLIDING CALIPER

[75] Inventors: Siegfried Gruhler, Vohringen; Michael Wolf, Oberndorf, both of Fed. Rep. of Germany

[73] Assignee: Societe Anonyme des Ets. Pierre Roch, France

[21] Appl. No.: 672,370

[22] Filed: Nov. 16, 1984

[30] Foreign Application Priority Data

Nov. 17, 1983 [DE] Fed. Rep. of Germany ....... 3341450

[51] Int. Cl.⁴ .............................................. G01B 3/38
[52] U.S. Cl. .............................. 33/143 M; 33/143 L
[58] Field of Search ............ 33/143 R, 143 L, 143 M, 33/147 J, 147 T, 147 N

[56] References Cited

U.S. PATENT DOCUMENTS 3,289,307 12/1966 Kelly ................................. 33/143 M
3,367,032 2/1968 Johnson ............................ 33/147 J
4,459,749 7/1984 Rieder et al. ..................... 33/143 L

OTHER PUBLICATIONS

"Caliper for Measuring Center-to-Center Distances of Holes," by Camico et al.—Western Electric Tech. Dig. No. 14; 4/1969.

Primary Examiner—Willis Little
Attorney, Agent, or Firm—McGlew and Tuttle

[57] ABSTRACT

A sliding caliper comprises a scale having a front end defining a measuring edge, a slide movable over the scale and having a readout display and a measuring tip depending from said scale and having an axis of symmetry passing through the measuring edge.

5 Claims, 6 Drawing Figures

U.S. Patent  Jan. 28, 1986  Sheet 1 of 2  4,566,199
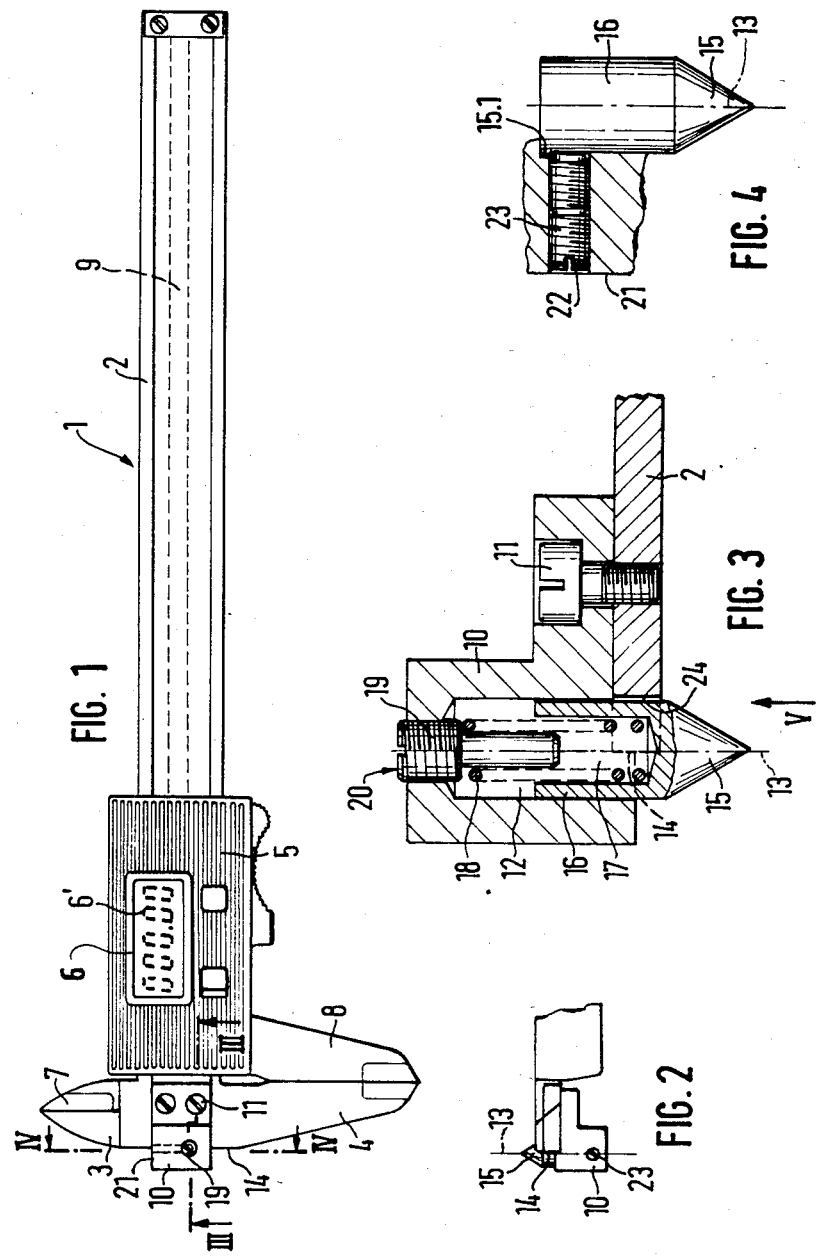

4,566,199

SLIDING CALIPER

FIELD AND BACKGROUND OF THE INVENTION

The invention relates in general to measuring devices and in particular to a new and useful sliding caliper which is selectively equipped with a vernier or a digital display and comprises a scale with a front, end-side measuring edge and a slide movable along the scale with a coincident front measuring edge, and which has a measuring tip at the scale for measuring bore spacings.

The generally known sliding calipers are not suitable for direct measurment of bore spacings if the bores to be measured have very small diameters, as for instance in the circuit board technology. The upper measuring beaks normally present on sliding calipers permit exact indirect measurement only if the bore diameters are large enough.

For this reason siding calipers have been developed which are equipped with measuring tips, to permit measuring also in case of small bore diameters. For this purpose, the lower measuring beak both of the scale and of the slide is formed as a measuring tip, or is equipped with a measuring tip, which is then screwed to the scale in the measuring plane as an accessory. When measuring bore spacings of bores with different diameters, the measuring tip lengths must be adjusted accordingly, so that there will be angle error relative to the scale. With such an equipment it is possible to determine the distance between two bores relatively without a problem. This equipment, however, does not permit measuring distances of bores from a fixed reference edge.

SUMMARY OF THE INVENTION

The invention provides a sliding caliper which permits sure and rapid measuring both of distances between bores and of bores from a plane reference surface.

According to the invention, there is inserted in the front end of a scale, perpendicular to the measuring plane, a measuring tip whose axis of symmetry passes through the measuring edge of the scale. Perpendicular to the measuring plane a second measuring tip may be provided in the slide, whose axis of symmetry passes through the measuring edge of the slide or of the measuring beak at the slide. This invention optimally solves the problem posed, with regard both to the stipulated function and the engineering expense, which is kept very low. Because of the fact that the front measuring edges of the scale and of the slide are used and the axis of symmetry of the measuring tip passes through the measuring edge, the measuring edge of the slide can lie flush against the outer edge of a circuit board, for example, while the measuring tip is inserted into the respective bore. The distance can always be read directly, without having to tilt or to turn the caliper. The center line of the measuring tip is identical in each case with the initial position of the depth scale and of the measuring beaks, whereby a common reference point is selected. The sliding caliper according to the invention makes possible proper abutment on the spine of the bar, and this is important especially in the case of thin components, such as circuit boards. The attached measuring tip extends the area of use of the sliding caliper in a meaningful manner. The measuring tip can be combined with any one of: a digital measurement display, a measuring slide with vernier, a depth measuring caliper, a shop caliper, and a special sliding caliper.

The additional tip secured on the slide, also perpendicular to the measuring plane, simplifies the measuring process for bore spacing measurements.

In a further development of the invention, the front end of the scale has a holder attached to it, with a bore whose axis of symmetry passes through the measuring edge of the scale, and which centrally receives a measuring tip which protrudes through a semicircular opening of the scale. The radius of the tip starts at the measuring edge and is equal to or greater than the radius of the cylindrical part of the measuring tip, and which is coincident with a semicircular opening at the measuring edge of the slide. In the cylindrical part of the measuring tip a blind bore may be provided, in which a spring is inserted which takes support axially on a screw or bolt closing the holder bore. This, as a whole, provides a simple mounting of the measuring tip on the scale, the tip being moreover spring-supported, a fact which contributes essentially to the protection of the tool and workpiece. The holder may be of angular form and may be joined to the scale by screws or by gluing. To ensure an exact, identical position of the measuring tip in the bore of the holder at all times, according to a further development of the invention, the upper side face of the holder contains a bore parallel to the longitudinal axis of the scale and a screw or bolt acts through the bore against the measuring tip normal to the axis of symmetry.

Accordingly it is an object of the invention to provide a sliding caliper for measuring an article which comprises a scale having a front end measuring edge adapted to be positioned on the article to be measured and a slide carried by said scale and having a readout display, and a measuring tip depending from said scale and having an axis of symmetry passing through the measuring edge.

A further object of the invention is to provide a sliding caliper which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a plan view of a sliding caliper with a measuring tip according to the invention;

FIG. 2 is a partial side elevational view of the head of the sliding caliper according to FIG. 1;

FIG. 3 is a section taken along line III—III of FIG. 1;

FIG. 4 is a section taken along the line IV—IV of FIG. 1;

DESCRIPTION OF THE PREFERRED EMBODIMENTS

Figure 5:
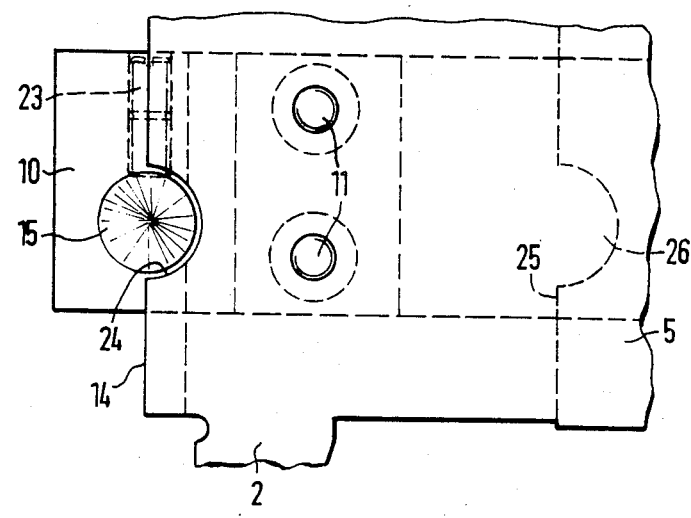
FIG. 5 is a bottom view of the head of the sliding caliper seen from the direction of arrow V in FIG. 3.

Referring to the drawings in particular the invention embodied therein comprises a sliding caliper for measuring an article which comprises a scale 2 having a front end defining a measuring edge 25 with a slide 5 movable over said scale and having a readout display 6. The caliper also includes a measuring tip 15 which depends from the scale and has an axis of symmetry passing through the measuring edge 25.

The sliding caliper, marked 1 as a whole, comprises a scale 2, upper and lower measuing beaks 3 and 4 applied on the scale 2, a slide 5 movable along scale 2 and having a digital display 6'(selectively with a vernier not shown here), and upper and lower measuring beaks 7 and 8 as well as a depth scale 9.

On the front end of scale 2 a holder 10 of angular cross section is placed, which is retained by two screws 11 guided perpendicular to the measuring plane. Holder 10 has a bore 12 whose axis of symmetry 13 passes through the measuring edge 14 in a direction perpendicular to the measuring plane of scale 2. In the bore 12 is the measuring tip 15, the cylindrical part 16 of which is provided a blind bore 17. A spring 18 engages in the blind bore 17 and it takes support axially on the head 19 of a screw 20 screwed into bore 12 from above. At the upper end face 21 of holder 10 starts an additional bore 22, into which is inserted a screw 23 with front collar, which by its inner end abuts against the measuring tip 15 crosswise. On this side, the measuring tip 15 has a flattened portion with a shoulder 15.1, which in the lowest position rests on screw 23 and prevents the measuring tip from falling out.

Into the measuring edge 14 of scale 2 a semicircular opening 24 is cut, whose radius starts at the measuring edge 14 and is equal to or greater than the radius of the cylindrical part 16 of measuring tip 15. Further there is provided at the measuring edge 25 of slide 5 a semicircular opening 26 which, in the closed state of the sliding caliper 1, is coincident with the opening 24 and also embraces the cylindrical portion 16 of the measuring tip 15. Measuring the distance of a bore of a circuit board from the outer edge thereof as reference surface is now effected in a simple manner by placing the measuring edge 25 of slide 5 against this reference surface while the measuring tip 15 of scale 2 dips into the respective bore on the circuit board. The measured distance can be read directly at the digital display 6 of caliper 1. The spring supported measuring tip 15 can adapt itself to any bore diameter to the maximum of the shank diameter, so that secure contact on the spine of the bar is ensured.

Figure 6:
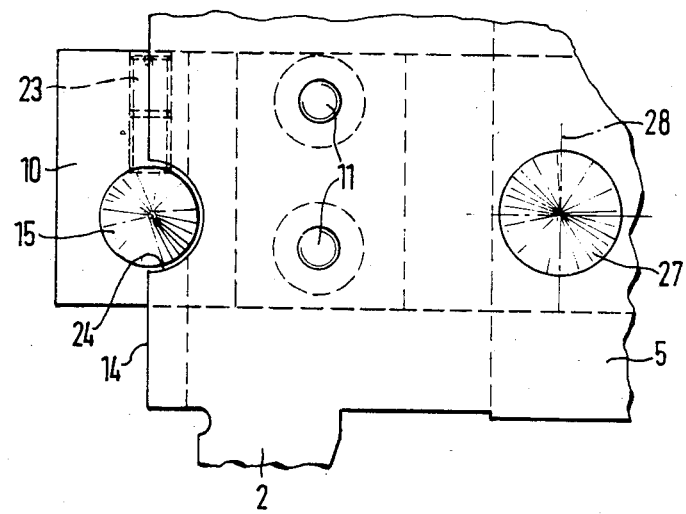
FIG. 6 is a view of an alternative for the head of the sliding caliper seen from arrow direction V in FIG. 3.

As an alternative to this described sliding caliper, a fixed measuring tip 27 may be arranged on slide 5, as is indicated in FIG. 6. Like the measuring tip 15 on scale 2, so also the measuring tip 27 is disposed perpendicular to the measuring plane. This makes it possible to measure bore spacings directly. The axis of symmetry 28 of the measuring tip 27 passes through the measuring edge 25 or respectively through the measuring edge of beak 8 at the slide. Insertion of the measuring tips 15 and 27 in bores spaced from each other results in a measure to be read directly on the caliper.

While specific embodiments of the invention have been shown and described in detail to illustrate the application of the principles of the invention, it will be understood that the invention may be embodied otherwise without departing from such principles.

We claim:

1. A sliding caliper for measuring an article, comprising a scale having a front end measuring edge adapted to be positioned on the article to be measured, a slide movable over said scale and having an opening defining a readout display of said scale, and a measuring tip depending from said scale and having an axis of symmetry passing through the measuring edge, a holder carried by said scale having a bore in an axis of symmetry passing through the measuring edge of said measuring tip being engaged in said bore and protruding through a semicircular opening of said scale edge, said tip having a radius which starts at the measuring edge and is at least equal to the radius of the cylindrical part of the measuring tip which is coincident with a semicircular opening on the measuring edge of the slide.

2. A sliding caliper according to claim 1, including a second measuring tip arranged perpendicular to said measuring edge carried by said slide and having an axis of symmetry passing through said measuring edge and including a measuring beak passing through said axis of symmetry.

3. A sliding caliper according to claim 1, wherein said cylindrical part of said measuring tip includes a blind bore, a spring in said blind bore and a screw engaged against said spring and closing said bore, and pressuring tip.

4. A sliding caliper according to claim 1, wherein said holder has an angular form and is connected with said scale by a threaded member.

5. A sliding caliper according to claim 4, wherein the upper lateral face of said holder contains a bore parallel to the longitudinal axis of said scale and a screw extending through said bore acting against said measuring tip extending perpendicular to the axis of symmetry.

* * * * *